US007576760B2

(12) United States Patent
Koshimizu et al.

(10) Patent No.: US 7,576,760 B2
(45) Date of Patent: Aug. 18, 2009

(54) MULTI-LEVEL OPTICAL WRITER

(75) Inventors: Minoru Koshimizu, Kanagawa (JP); Tsutomu Ishii, Kanagawa (JP); Yasunori Saito, Kanagawa (JP); Ikutaroh Nagatsuka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 659 days.

(21) Appl. No.: 11/269,534

(22) Filed: Nov. 9, 2005

(65) Prior Publication Data

US 2006/0244698 A1 Nov. 2, 2006

(30) Foreign Application Priority Data

May 2, 2005 (JP) ............................. 2005-134087

(51) Int. Cl.

*G09G 3/30* (2006.01)
*G09G 3/36* (2006.01)
*G02F 1/135* (2006.01)
*G02F 1/1335* (2006.01)
*G02F 1/13* (2006.01)

(52) U.S. Cl. .......................... 345/695; 345/81; 345/89; 349/2; 349/12; 349/25; 349/29; 359/294

(58) Field of Classification Search ........... 345/55–107, 345/204–214, 690–697; 349/2, 12, 25, 29; 359/294

See application file for complete search history.

(56) References Cited

U.S. PATENT DOCUMENTS

| | | | | |
|---|---|---|---|---|
| 5,905,547 | A * | 5/1999 | Shimizu et al. | 349/2 |
| 6,137,518 | A * | 10/2000 | Maeda | 347/131 |
| 6,445,489 | B1 * | 9/2002 | Jacobson et al. | 345/107 |
| 6,882,355 | B2 * | 4/2005 | Kobayashi | 347/111 |
| 6,940,570 | B1 * | 9/2005 | Sumida et al. | 349/61 |
| 7,106,476 | B1 * | 9/2006 | Tonami et al. | 358/1.9 |
| 7,265,864 | B2 * | 9/2007 | Koshimizu et al. | 358/1.16 |
| 7,330,290 | B2 * | 2/2008 | Takahashi et al. | 358/1.9 |
| 2006/0092148 | A1 * | 5/2006 | Ozawa et al. | 345/204 |

FOREIGN PATENT DOCUMENTS

| | | |
|---|---|---|
| JP | 07-077703 | 3/1995 |
| JP | 2001-301233 | 10/2001 |

* cited by examiner

*Primary Examiner*—David L Lewis
(74) *Attorney, Agent, or Firm*—Oliff & Berridge, PLC

(57) ABSTRACT

A multi-level optical writer for writing an image by illumination to an optical-write-type recording medium laid with a display layer having a memory nature and a photoconductive layer, the optical writer includes: a holding portion holding the optical-write-type recording medium; and a write section for writing a multi-level image to the display layer by illuminating, to the photoconductive layer, image light having optical dots different in size in accordance with a gray level.

19 Claims, 14 Drawing Sheets

MULTI-LEVEL OPTICAL WRITER

BACKGROUND OF THE INVENTION

1. Field of the Invention

The present invention relates to an optical writer for writing an image by illumination to an optical-write-type display recording medium laid with a display layer and photoconductive layer having a memory nature, and more particularly to a multi-level optical writer for writing a multi-level image to an optical-write-type recording medium having a binary gray-level characteristic.

2. Background Art

Recently, attentions are drawn to the display recording medium having both the merits of electronic display and paper (also termed as an electronic or digital paper) besides paper mediums and electronic display devices, as a display recording medium.

Because this display recording medium possesses a memory nature as to display, write energy is satisfactorily provided by an image writer only during rewriting its information wherein there is no need of energy for maintaining the display. Accordingly, after writing information, the display recording medium solely is to be separated from the image writer so that it can be conveniently carried, piled up and arranged or held in the hand to read information.

The display recording mediums having memory natures as above include a known optical-write-type display recording medium capable of visibly and erasably storing an image by light illumination and voltage application and optical writer for writing an image to the display recording medium (see JP-A-2001-301233).

In the optical-write-type display recording medium described in JP-A-2001-301233, a liquid-crystal layer and a photoconductive layer, whose resistance is to be changed by light illumination, are laid between one pair of transparent electrodes. Meanwhile, in the optical writer for writing an image to the display recording medium, a two-dimensional light pattern is illuminated from an LCD (liquid-crystal display) panel to a photoconductive layer of the display recording medium through a two-dimensional micro-lens array in a manner focused thereon, thereby causing a resistance distribution based on the light pattern on the photoconductive layer. By applying a voltage to between the transparent electrodes through an electricity receiver, a divisional voltage based on the resistance distribution over the photoconductive layer is applied to the liquid crystal, thereby recording an image on the liquid-crystal layer in accordance with the divisional voltage distribution.

According to this optical writer, printing is possible by making a lighting of image information two-dimensionally while applying a voltage to the one pair of electrodes entirely. A large capacity of image information can be written at high speed, as compared to line-based lighting or scan-based lighting.

Also, there is also known a liquid-crystal display adapted for multi-level writing to a display recording medium thus enabling multi-level display (see JP-A-7-77703).

This display device employs a display recording medium having one pair of transparent electrodes at the inside of one pair of transparent electrode, between which provided are a first-carrier injection layer, a photoconductive layer and a second-carrier injection blocking layer. By a gray-level controller operating based on a signal representative of an image multi-level concentration, an lighting device is driven to generate modulated output light. With the output light, the photoconductive layer is lighted to obtain a high resolution and correct gray-level representation.

However, in the liquid-crystal display device, lighting is with a correction by the gray-level controller such that the non-linearity in the light transmissivity characteristic on the dimmer layer of the display recording medium turns into a linearity. Thus, application is impossible to a structure not having a dimmer layer.

FIGS. 14A to 14C show a light intensity distribution, during lighting, on a display recording medium structured not having a dimmer layer. The display recording medium 144 of this kind has a binary γ-characteristic (gray-level characteristic) shown in FIG. 14B. As shown in FIG. 14B, on an lighting surface 143 receiving the emission light 142 from a pixel 143 of an lighting panel 141, the resulting intensity distribution is rectangular in form sharply attenuated at peripheral regions even in case the emission light 142 is intensity-modulated.

In the case intensity modulation is done for the emission light of from the pixels of the lighting panel 141, the maximum level in the intensity distribution increases or decreases but there is no significant change in the area itself at a threshold E1 level required in printing. As a result, there is no change in the optical dot (image dot) size on the optical-write-type display recording medium 144. As shown in FIG. 14C, the optical dot 145*a* based on weak lighting and the optical dot 145*b* based on intense lighting are equivalent in size, making it impossible to form a gray-level image.

However, according to the conventional multi-level optical writer, gray-level representation is not available on the optical-write-type display recording medium having a binary gray-level characteristic even in case illumination is with an intensity-modulated lighting because of no change in optical spot size.

SUMMARY OF THE INVENTION

It is an object of the present invention to provide a multi-level optical writer capable of stably forming a multi-level image, by the simple structure, to an optical-write-type display recording medium having a binary gray-level characteristic.

In order to solve the problem, the present invention is a multi-level optical writer for writing an image by illumination to an optical-write-type recording medium laid with a display layer having a memory nature and a photoconductive layer, the optical writer including: a write section for writing a multi-level image to the display layer by illuminating, to the photoconductive layer, image light having optical dots different in size in accordance with a gray level.

According to the multi-level optical writer, by illuminating a light dot to the photoconductive layer of optical-write-type recording medium, an image dot can be written to the display layer correspondingly to the size of the optical dot. By changing the optical dot size depending upon a gray level, the image dot to be written to the display layer is changed in size. Accordingly, by controlling image-dot size and image-dot gathering state, gray-level representation is possible in a pseudo fashion. Meanwhile, because the capability of controlling image-dot size commensurate with size of a light-dot written by the light spot, control is possible as to the overlap state with the light dots on the lighting surface thereby making it possible to form a sharp image reduced in image blur.

The display layer having a memory nature can use a material based on a liquid-crystal material such as a cholesteric liquid crystal, a smectic liquid crystal and a ferroelectric liquid crystal, or a material utilizing a phenomenon as to the movement of a charged colored particle in a gas or liquid under electric field.

The write section may have a signal generating section for generating a light intensity signal in accordance with a gray-level signal and a light-emitting section arranged in close contact with or in proximity to the optical-write-type display recording medium and for emitting the image light having the optical dots different in light intensity and In size depending upon the light intensity signal. By changing the light intensity according to a light intensity signal, the light intensity form at a threshold level is changed to provide light dots different in size. “Proximity” refers to a distance in a degree not to cause a blur in the image written to the optical-write-type display recording medium (e.g. 1 mm or smaller).

The light-emitting section may have a pixel array arranged two-dimensionally with a plurality of pixels for emitting the optical dots. Image writing can be at high speed because of no need of relatively scanning a pixel array. An image array may be used which is arranged with a plurality of pixels one-dimensionally. In this case, relative scanning of the pixel array is required.

The pixel array may have a light restriction member for restricting a light-emission area of each of the pixels to a narrower range than an effective pixel area that the light-emission area of the pixel is defined by a pixel density. This structure provides a light-intensity distribution in a mountain form, in an lighting pattern emitted from the pixel and reached the photoconductive layer of the display medium while spreading toward the periphery thereof. As size of a light spot can be changed by light-intensity modulation, size of a light-dot (image dot) written by the light spot to the display medium can be modulated.

The light restriction member may have a plurality of circular or rectangular light-transmission areas correspondingly to the pixels. Meanwhile, the light restriction member may have a plurality of light-transmission filters for transmitting a predetermined frequency band of light correspondingly to the pixels. This provides a light dot in a form approximated to a circular or rectangular form of light transmission area.

The pixel array may have a filter for providing a light intensity distribution to light emitted from the pixels. Even where the light emitted from the pixel has a rectangular light intensity distribution, this filter can provide it with a mountain-formed light intensity distribution, thus making it possible to change the size of the light-dot written by the light spot by light-intensity modulation.

Meanwhile, the pixel array may have a conversion member for converting a rectangular light intensity distribution haven by light emitted from the pixel into a light intensity distribution in a mountain form. This structure makes it possible to change the size of the light-dot written by the light spot by light-intensity modulation.

The light-emitting section can use a flat display, e.g. an LCD (liquid-crystal display), an ELD (electroluminescence display), a PDP (plasma display), a VFD (fluorescent character tube) display, an LED (light-emitting diode) display and an FED (field emission display), or a CRT display. In the case of using an LCD, long life is to be expected. In the case of using an ELD, a backlight can be rendered unnecessary.

The light-emitting section uses a color LCD using an RGB filter as the light restricting member and a light source, as a backlight, for generating red, green or blue light. Because the red, green or blue light of from the light source transmits through the R, G or B portion of the RGB filter, the light-emission area of the pixel is restricted into a narrower range. According to this structure, the RGB filter generally broadly used can be utilized as a light restricting member, simplifying the structure.

The light-emitting section may use an EL display and the light-emission area of the pixel be restricted to a narrower range than a pixel effective area that the light-emission area of the pixel is defined by a pixel density by setting a width of at least one of row and column electrodes to a predetermined value. This provides a light-intensity distribution in a mountain form, in an lighting pattern emitted from the pixel and reached the photoconductive layer of the display medium while spreading toward the periphery thereof. Size of a light-dot written by the light spot can be changed by light-intensity modulation.

The EL display may have pixels each structured with a light-emission area and a non-light-emission area thereby restricting the light-emission area of the pixel to a narrower range than a pixel effective area that the light-emission area of the pixel is defined by a pixel density. In this case, the pixels may be driven by voltage application means such as TFT elements. This makes it possible to provide a light-intensity distribution in a mountain form. Size of a light-dot written by the light spot can be changed by light-intensity modulation.

According to the multi-level optical writer in the invention, a multi-level image can be stably formed to an optical-write-type recording medium having a binary γ-characteristic (gray-level characteristic) by the simple structure. Meanwhile, the capability of controlling pixel dot size makes it possible to form a sharp image reduced in image blur.

BRIEF DESCRIPTION OF THE DRAWINGS

These and other objects and advantages of this invention will become more fully apparent from the following detailed description taken with the accompanying drawings in which:

FIGS. 1A and 1B show a multi-level optical writer according to a first embodiment of the present invention wherein FIG. 1A is a structure while FIG. 1B is a cross-sectional view of an lighting panel;

FIGS. 3A to 3C showing a principle of multi-level optical writer according to the invention wherein FIG. 3A is a light intensity distribution over an lighting surface, FIG. 3B is a reflectivity-lighting characteristic figure, and FIG. 3C is an image view typically showing an lighting result;

FIGS. 5A to 5E showing a principle of the second embodiment wherein FIG. 5A is an image view of input image data, FIG. 5B is a pixel structural view in the conventional writer, FIG. 5C is a pixel structural view in the invention, FIG. 5D is an image view written on a display recording medium by the conventional writer, FIG. 5E is an image view written on a display recording medium by the writer of the invention;

FIGS. 9A and 9B show a multi-level optical writer according to a tenth embodiment of the invention wherein FIG. 9A is a cross-sectional view while FIG. 9B is a partial plan view;

FIGS. 12A and 12B show example 1 in the invention wherein FIG. 12A is a structural view of a multi-level optical writer while FIG. 12B is a block diagram showing a configuration of a control system;

FIGS. 13A and 13B show example 2 in the invention wherein FIG. 13A is a block diagram showing the control system configuration while FIG. 13B is a sectional view of an lighting panel; and FIGS. 14A to 14C showing a principle of multi-level optical writer according to the invention wherein FIG. 14A is a light intensity distribution over an lighting surface, FIG. 14B is a reflectivity-lighting characteristic figure, and FIG. 14C is an image view typically showing an lighting result.

DETAILED DESCRIPTION OF THE PREFERRED EMBODIMENTS

Figure 1A:
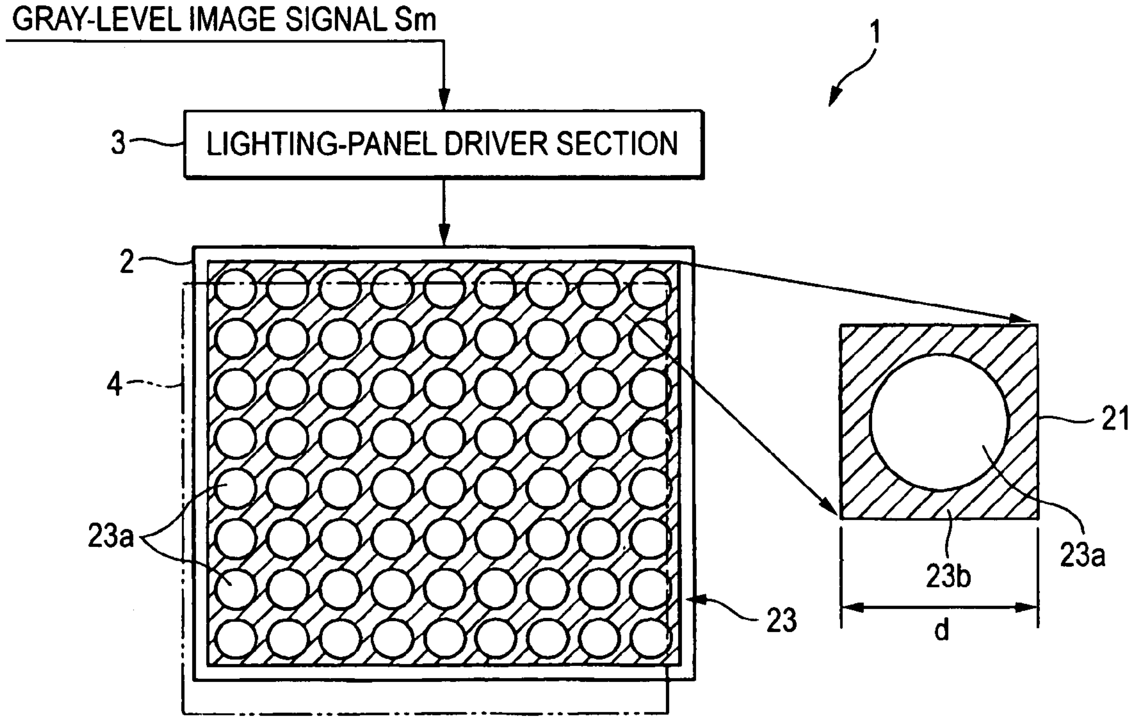
Figure 1B:
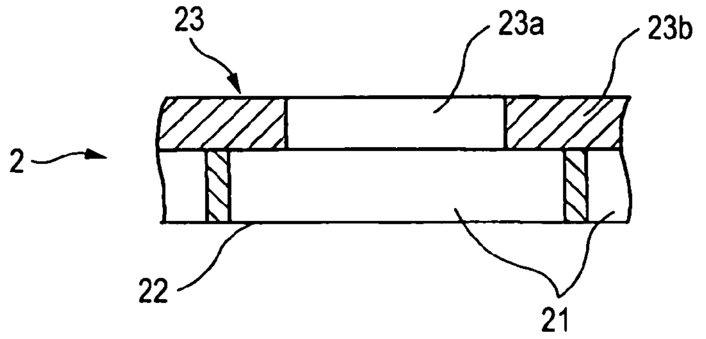

FIGS. 1A and 1B show a multi-level optical writer according to a first embodiment of the present invention. A multi-level optical writer 1 has an lighting panel 2 as a light illuminator placed oppositely to an optical-write-type display recording medium (hereinafter, referred to as a "display recording medium") and arranged with a plurality of pixels 21 two-dimensionally, and an lighting-panel drive section 3 as a signal generating section for controlling the emission-light levels on the pixels of the lighting panel 2 according to a gray-level image signal Sm sent from a not-shown control section. Incidentally, a write section is constituted by the lighting panel 2 and the lighting-panel drive section 3.

The lighting panel 2 has an LCD (liquid-crystal display) panel and a backlight arranged at backside of the LCD panel and for emitting white light or the like. Note that the lighting panel 2 may employ another structure, e.g. an ELD (electroluminescence display).

Meanwhile, in the lighting panel 2, a light restriction member 23 is bonded or applied on a light-emitting surface of the LCD panel 22, which is to restrict the light-emission area per pixel 21 to a range narrower than an effective pixel area as defined by a pixel density (arrangement interval d of pixels 21).

The light restriction member 23 is made up by a plurality of light transmission areas 23*a* each formed circular in the center of the pixel and a light shade area 23*b* formed around the light transmission areas 23*a*. The light transmission area 23*a* has a light-emission area preferably in a range of 20-80% of the effective pixel area, more preferably in a range of 30-50% of the effective pixel area. The LCD panel 22 like this can be formed by a concentration filter or a light-absorbing filter. Incidentally, as for the light restriction member 23, a plurality of light transmission areas 23*a* may be formed by forming a light shade area 23*b* of a resin dispersed with a carbon black particle and providing openings at respective centers of pixels.

Figure 2:
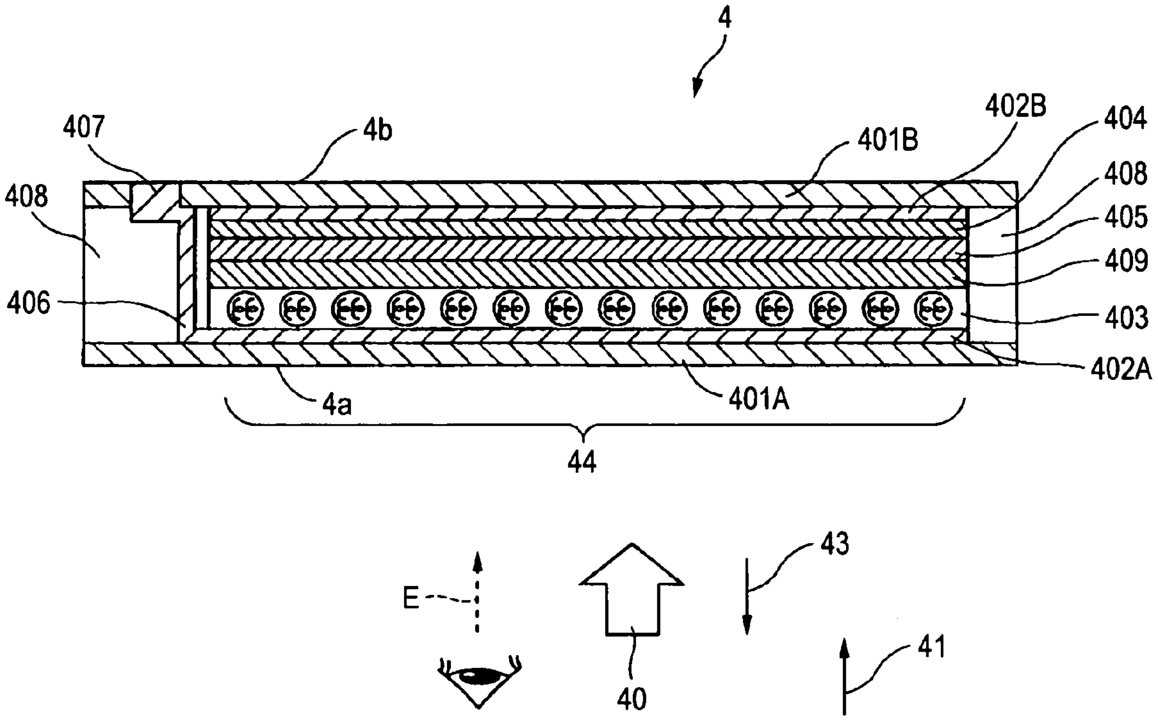
FIG. 2 is a cross-sectional view of a display recording medium according to the first embodiment.

FIG. 2 shows a structure of the display recording medium 4. The display recording medium 4 has one pair of transparent substrates 401A, 401B formed by PET (polyethylene telephthalate) films arranged oppositely, one pair of transparent electrodes 402A, 402B provided inner than the one pair of substrates 401A, 401B and formed of ITO (indium tin oxide), a liquid-crystal layer 40 provided inner than the transparent electrodes 402A and formed of a cholesteric liquid crystal having a reflectivity (transmissivity) changing responsive to application voltage, light absorbing layer 404 arranged inner than the transparent electrode 402B, a photoconductive layer 405 arranged inner than the light absorbing layer 404 and formed such that its resistance decreases due to illumination of a write pattern light 40 to an image write display region 44, an extension 406 extending from the transparent electrode 402A over to a backside 4*b*, one pair of electricity receivers 407 connected to the extension 406 and transparent electrode 402B and exposed in the backside 4*b*, a resin charge 408 filled in a manner buried between the substrates 401A, 401B, an isolation layer 409 provided between the liquid-crystal layer 403 and the photoconductive layer 405.

Figure 3A:
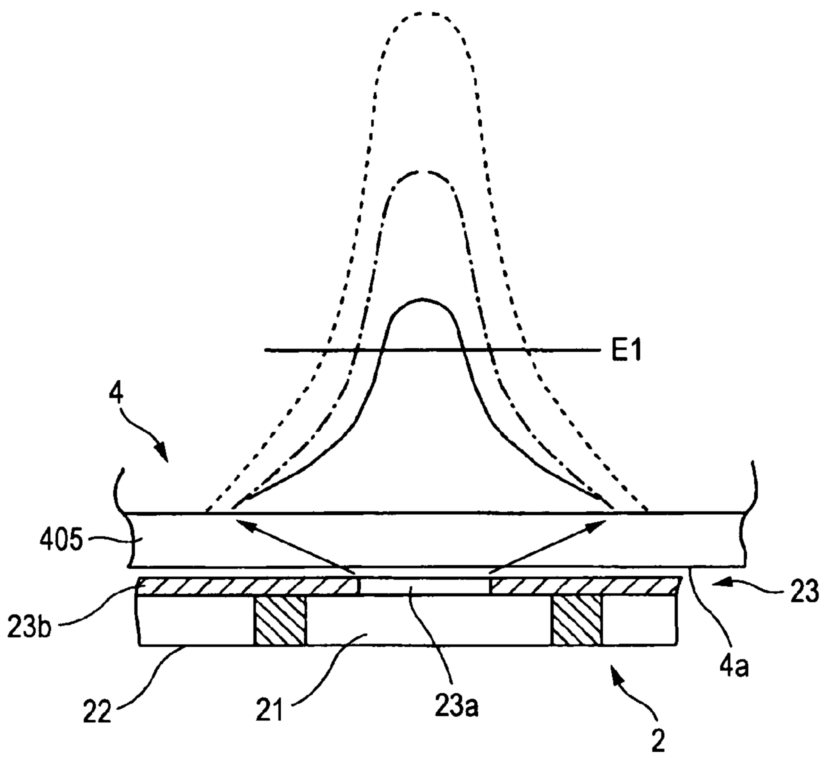
Figure 3B:
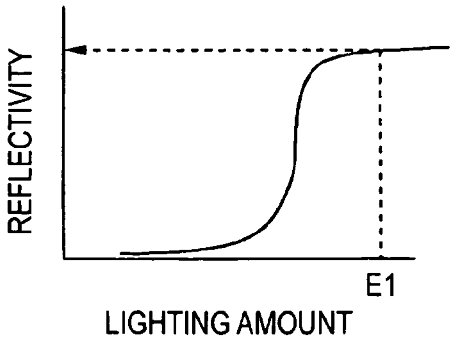
Figure 3C:
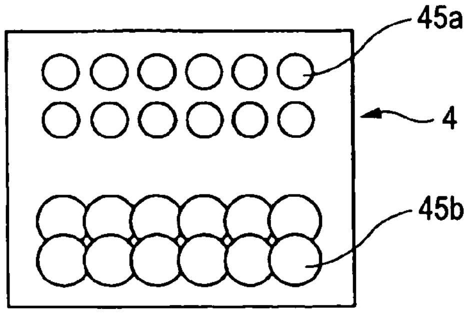

Referring to FIGS. 1A to 3C, the operation of the multi-level optical writer 1 is now explained. FIGS. 3A to 3C show an operation principle of the multi-level optical writer 1.

At first, the display recording medium 4 is set up on the lighting panel 2 with a gap of 1 mm or smaller, preferably 200 μm or smaller, more preferably in close contact therewith, manually by the user or automatically such that the image write display region 44 is opposed to a lighting surface of the lighting panel 2.

Then, the user operates an operating section, not shown, and selects an image-to-write, thus effecting a write instruction. Thereupon, the control section, not shown, applies a predetermined voltage to between the one pair of electricity receivers 40 from a power source, not shown. Meanwhile, when the control section forwards a gray-level image signal Sm to the lighting-panel drive section 3, the lighting-panel drive section 3 drives the lighting panel 2 to emit light at the pixels 21 in a multi-level fashion and controls the pixels 21 for display by the dot-sequential drive scanning, the line-dot sequential drive scanning or so, thus effecting a lighting to the display recording medium 4.

Figure 14A:
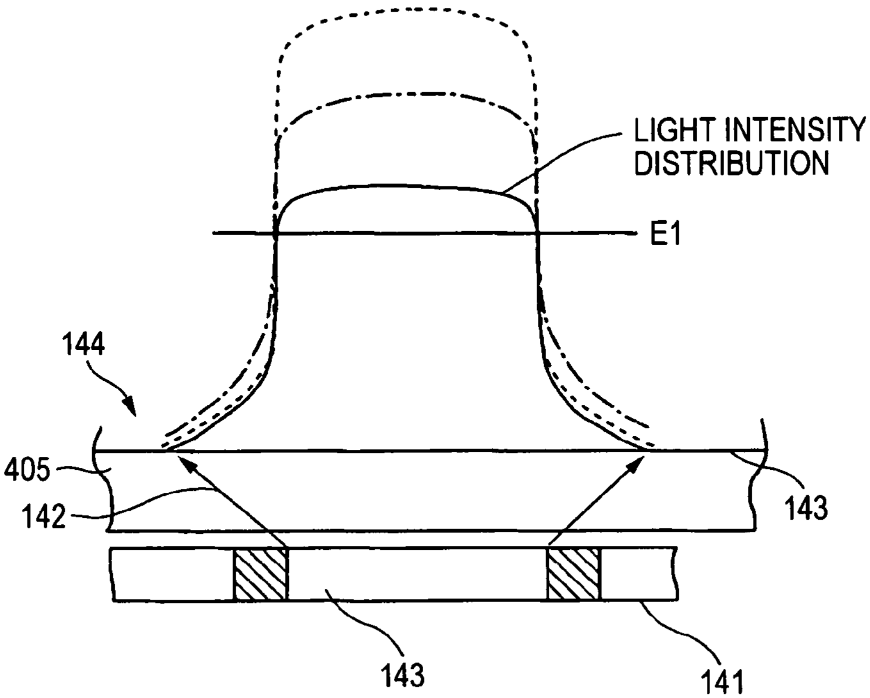
Figure 14B:
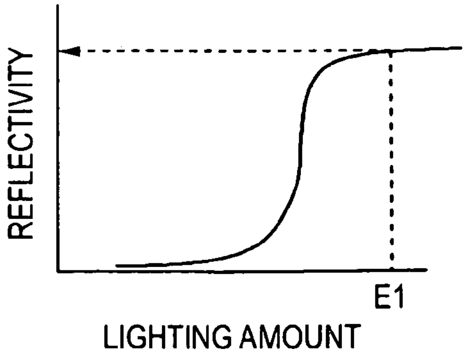
Figure 14C:
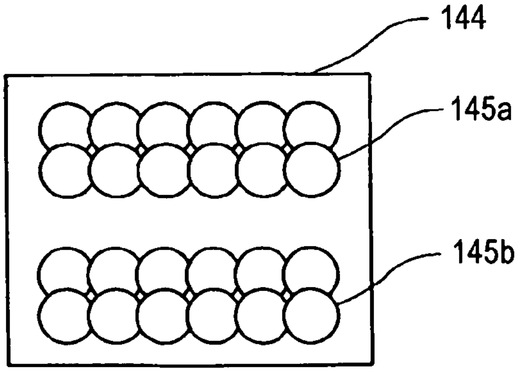

In the case the pixel 21 is regulated in its light amount by the light restriction member 23, the emission light emitted from the relevant pixel 21 and reached the image write display region 44 (lighting surface) 44 of the display recording medium 4 has an intensity distribution in a mountain form having a peak at the center, as shown in FIG. 3A. Meanwhile, in the case modulation is done to increase the intensity of the emission light from the pixels 21, the intensity distribution at its base together with the peak rises to increase the cross-sectional area at a threshold level required in printing. As a result, there is a significant change in size of the light-dot (image dot) over the photoconductive layer 405 of the display recording medium 4. As shown in FIG. 3C, a light dot 45*a* smaller in size is formed at weak lighting while a light dot 45*b* greater in size is formed at intense lighting, which improves the reproducibility with gray levels. Incidentally, the γ-characteristic in FIG. 3B is similar to that of FIG. 14B because the display recording medium 4 is the same in structure as the existing one.

In the display recording medium 4, the write pattern light 40, illuminated from the lighting panel 2 onto the image write display region 44, enters at the substrate 401A and reaches the photoconductive layer 405 via the transparent electrode 402A, the liquid-crystal layer 403 and the isolation layer 409. The photoconductive layer 405 decreases its resistance at a portion illuminated with light, which increases the partial voltage to the liquid-crystal layer that is determined by the impedance ratio to the photoconductive layer 405, thus increasing the light reflectivity upon the liquid-crystal layer 403. Accordingly, during illumination of illumination light 41 to the surface 4*a* of the display recording medium 4*a*, the region of the liquid-crystal layer 403 illuminated with write pattern light 40 has an increased reflectivity, which is to be seen white due to the reflection of the illumination light 41. The region not illuminated with write pattern light 40 is to be seen black because the illumination light 41 transmits through the liquid-crystal layer 403 and absorbed in the light absorbing layer 404, allowing the reflection light 43 to be viewed black. Thus, the reflection light can be visually perceived as an image in a direction E. The image is to be held over a long time even after ceasing the voltage application to the electricity receivers 407.

According to the first embodiment, a multi-level image can be stably formed on the display recording medium 4 having a binary γ-characteristic (gray-level characteristic) without implementing an especial image processing to the gray-level signal Sm. Meanwhile, the structure is simple because of no need of an especial dimmer layer.

Figure 4:
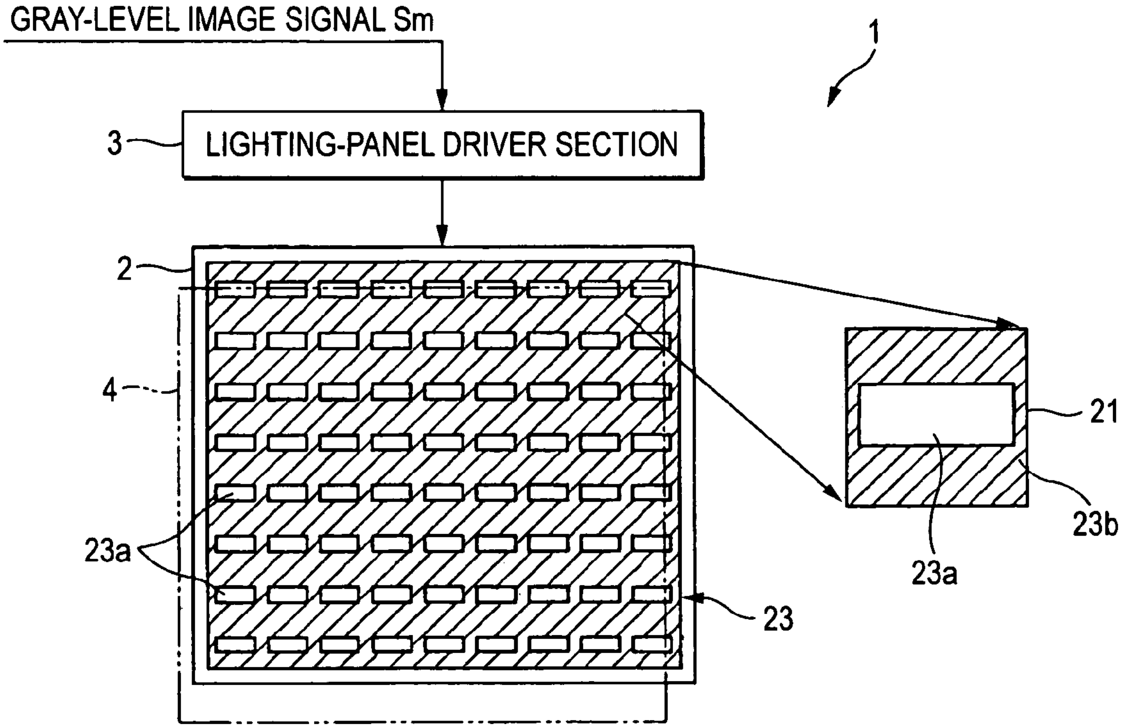
FIG. 4 is a structural view showing a multi-level optical writer according to a second embodiment of the invention.

FIG. 4 shows a multi-level optical writer according to a second embodiment of the invention. The second embodiment is similar in structure to the first embodiment excepting in that, in the first embodiment, the light transmission area 23*a* of the light restriction member 23 is changed in from circular into rectangular. The light transmission area 23*a* herein is horizontally long but may be vertically long.

Figure 5C:
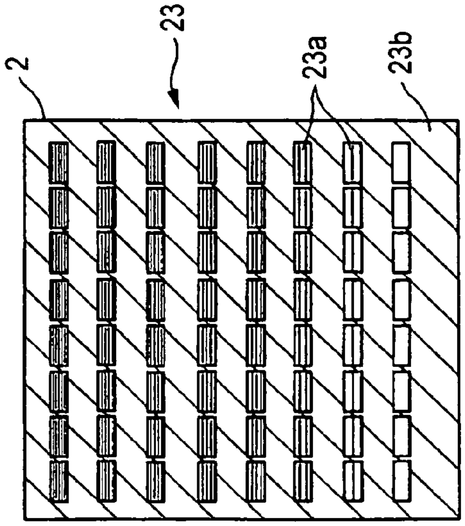
Figure 5E:
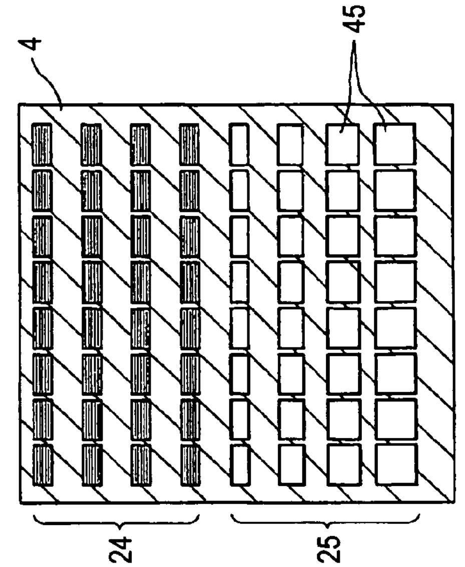
Figure 5B:
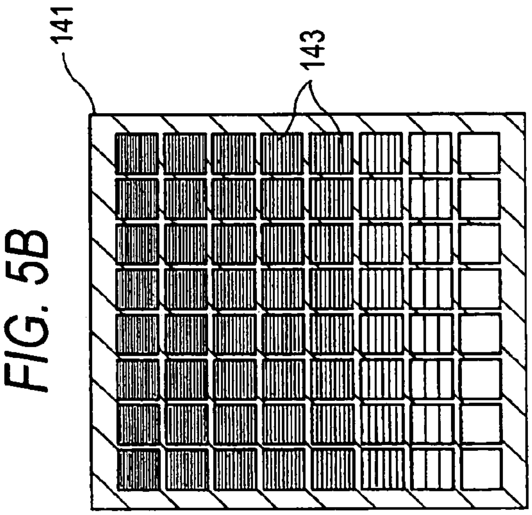

FIG. 5A to 5E show an operation principle of a second embodiment. In the conventional lighting panel 141, because no restriction is provided in the light-emitting region as shown in FIG. 5B, the light intensity distribution, on the pixel, has a uniform rectangular form. Contrary to this, with the lighting panel 2 in the second embodiment, the light intensity distribution, on the pixel, has a mountain-like form, as shown in FIG. 5C.

Figure 5D:
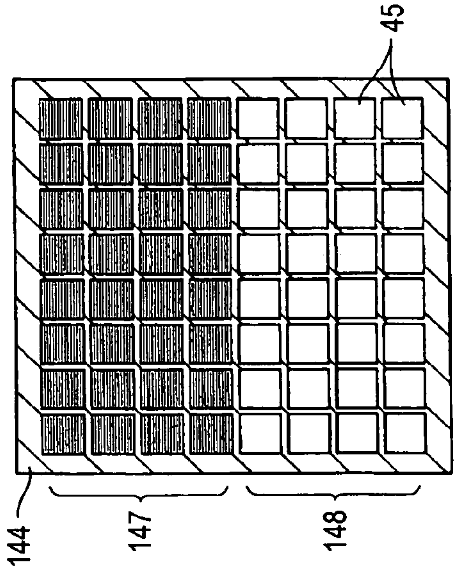
Figure 5A:
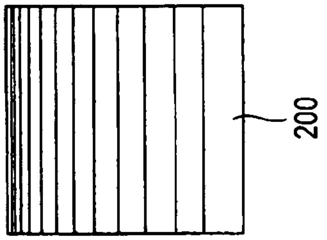

Accordingly, when lighting is made based on such multi-level input image data 200 as shown in FIG. 5A, the writing to the display recording medium 144 by the conventional lighting panel 141 provides a binary display with a black print region 147 and a white print region 148, as shown in FIG. 5D. On the contrary, with the lighting panel 2 according to the second embodiment, the optical dots 45, in a black print region 24, are identical in size similarly to the conventional black print region 147. However, in a white print region 25, lighting is such that on-pixel light amount is different from row to row to thereby make the optical dots 45 different in size. Due to this, multi-level display is obtained.

According to the second embodiment, a multi-level image can be stably formed on the display recording medium 4 having a binary γ-characteristic (gray-level characteristic) by the simple structure, similarly to the first embodiment.

Figure 6:
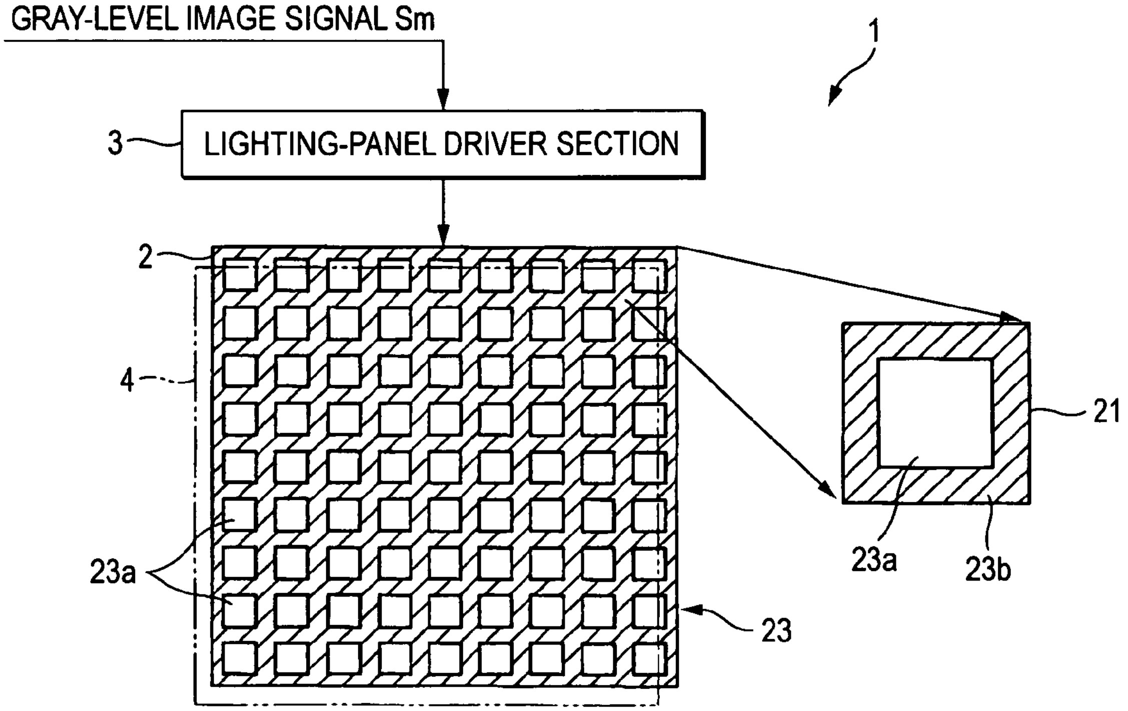
FIG. 6 is a structural view showing a multi-level optical writer according to a third embodiment of the invention.

FIG. 6 shows a multi-level optical writer according a third embodiment of the invention. The third embodiment is similar in structure to the first embodiment excepting in that, in the first embodiment, the light shade area 23*b* of the light restriction member 23 is changed into a frame form thereby making the light transmission area 23*a* square in form. According to the third embodiment, because rectangular optical dots different in size are illuminated to the display recording medium 4 according to a gray-level image signal Sm, a gray-level image can be displayed similarly to the second embodiment.

FIGS. 7A to 7C and 8A to 8C respectively show the light restriction members 23 on one pixel according to fourth to ninth embodiments.

Figure 7A:
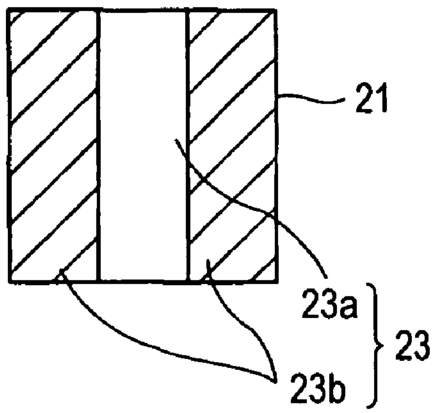
FIGS. 7A to 7C are plan views respectively showing light restriction members according to fourth to sixth embodiments of the invention.

A light restriction member 23 in a fourth embodiment has a light transmission area 23*a* in a strip form in the center and a light shade area 23*b* provided on both sides thereof, as shown in FIG. 7A. According to the fourth embodiment, the effect can be obtained similar to that of the second embodiment.

Figure 7B:
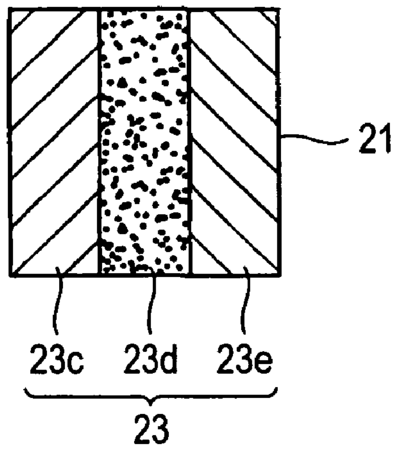

A light restriction member 23 in a fifth embodiment is made up by a three-color filter having a blue-light transmission area 23*c*, a red-light transmission area 23*d* and a green-light transmission area 23*e*, side by side, on each pixel, as shown in FIG. 7B. Incidentally, a two-color filter may be employed that has light transmission areas different in color, e.g. red and green. In the fifth embodiment, by using an red LED as a red-light source for a backlight to the lighting panel 2, red light transmits through only the red-light transmission area 23*d* but light absorption is done at the blue-light transmission area 23*c* and green-light transmission area 23*e*. According to the fifth embodiment, because the emission light from the red-light source can be restricted in amount by the red-light transmission area 23*d*, a gray-level image can be written to the display recording medium 4 similarly to the first embodiment.

Figure 7C:
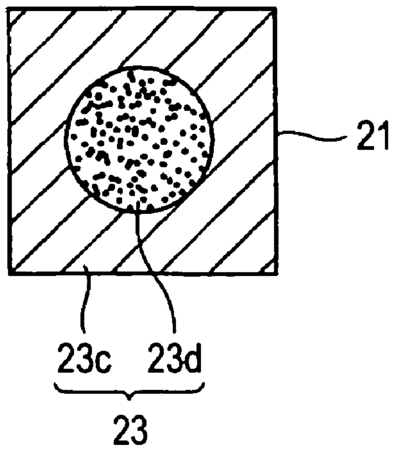

A light restriction member 23 in a sixth embodiment employs a two-color filter formed with a circular red-light transmission area 23*d* for transmitting red light and the surrounding blue-light transmission area 23*c* for transmitting blue light, as shown in FIG. 7C. According to the sixth embodiment, by using a red-light source as a backlight to the lighting panel 2, light transmission is only through the red-filter area, thus obtaining the effect similarly to the fifth embodiment.

Figure 8A:
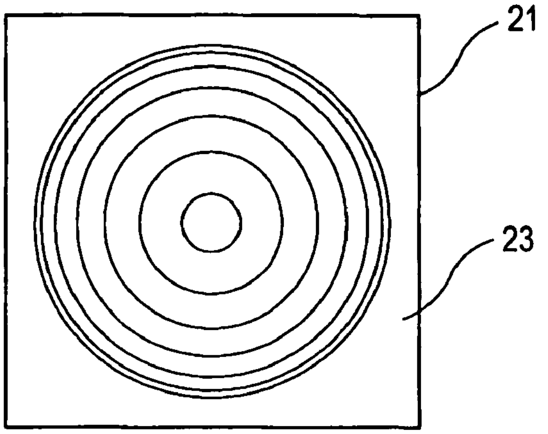
FIGS. 8A to 8C are plan views respectively showing light restriction members according to seventh to ninth embodiments of the invention.

A light restriction member 23 in a seventh embodiment is based on a concentration filter having a light transmissivity continuously decreasing in a direction from the center toward the outer, as shown in FIG. 8A.

Figure 8B:
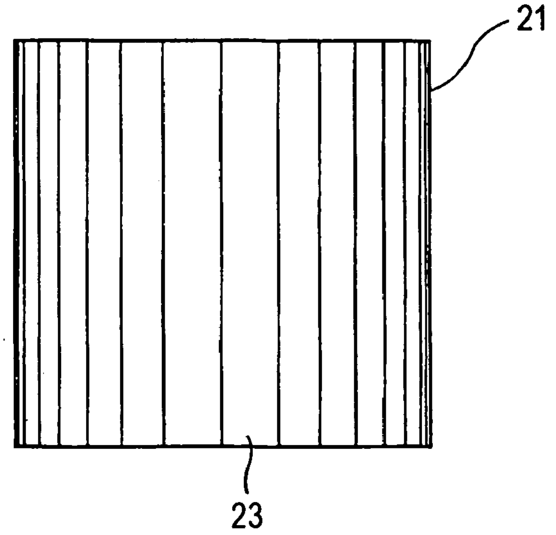

A light restriction member 23 in an eighth embodiment is based on a concentration filter having a light transmissivity continuously decreasing in a direction from the center toward the left and right, as shown in FIG. 8B. This concentration filter is to have a light intensity distribution spreading one-dimensionally before reaching the photoconductive layer 405 of the display recording medium 4. Incidentally, it may use a concentration filter made such that the light transmissivity decreases continuously in a direction from the center toward the upper and lower in the figure.

Figure 8C:
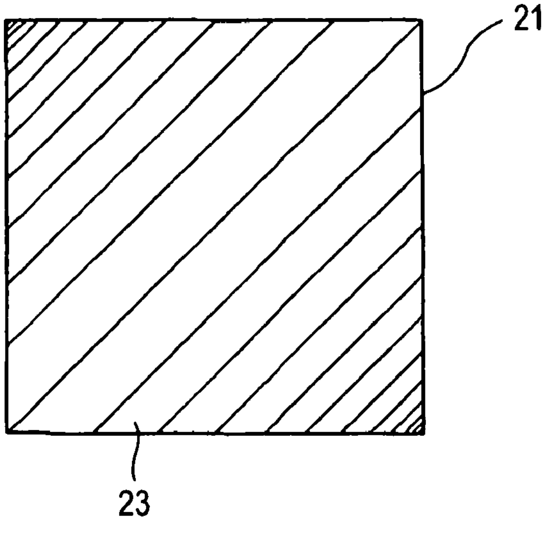

A light restriction member 23 in a ninth embodiment is based on a concentration filter having a light transmissivity continuously decreasing in a direction diagonally from the center, as shown in FIG. 8C.

According to the seventh to ninth embodiments, it is possible to obtain a light-intensity distribution characteristic whose distribution has a value maximal at the pixel 21 center and decreasing in a direction toward the periphery thereof, i.e. so-called a Gaussian distribution characteristic. As a result, an image having a gray-level characteristic can be written to the display recording medium 4, similarly to the first embodiment.

Figure 9A:
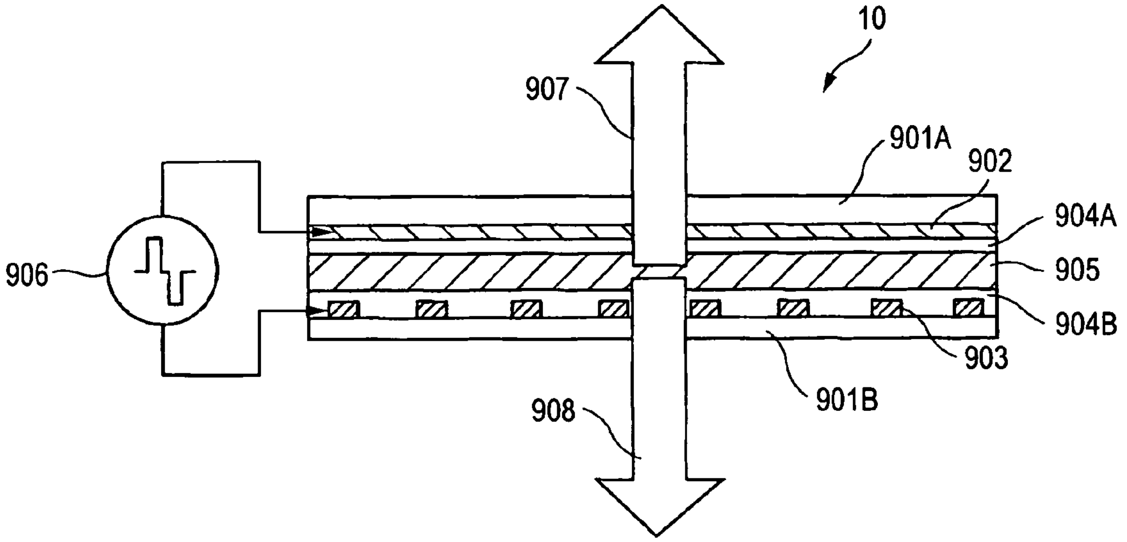
Figure 9B:
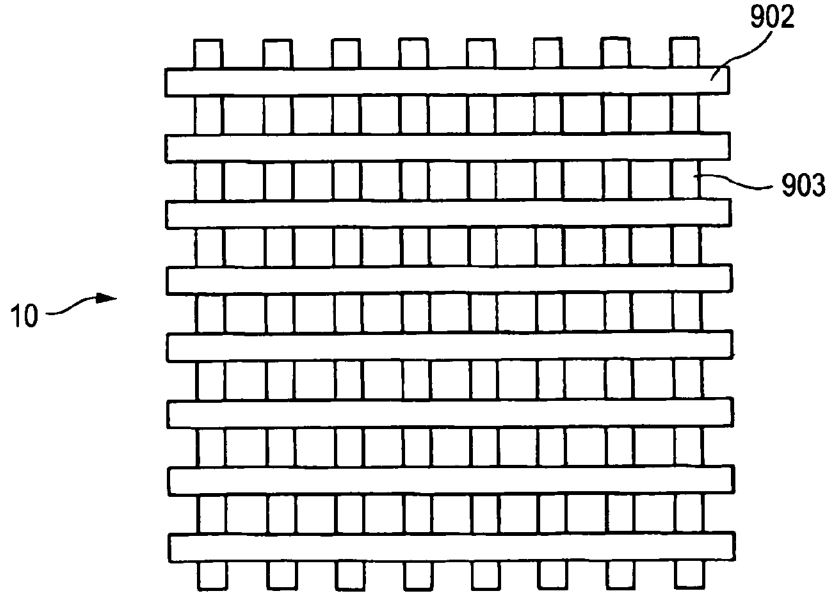

FIGS. 9A and 9B show a lighting panel according to a tenth embodiment of the invention. In the figure, FIG. 9A is a sectional view while FIG. 9B is a partial plan view. The tenth embodiment is similar in structure to the first embodiment excepting in that, in the first embodiment, a lighting panel 10 based on an inorganic EL display 10 is used in place of the LCD-based lighting panel 2.

The lighting panel 10 is formed with one pair of transparent substrates 901A, 901B, a plurality of row electrodes 902 of ITO provided at a constant interval and inner than the transparent substrate, a plurality of column electrodes 903 of ITO provided at a constant interval and orthogonal to the row electrodes 902 inner than the transparent substrate 901B, one pair of insulation layers 904A, 904B provided inner than the row electrodes 902 and column electrodes 903, and a polycrystal thin film provided between the insulation layers 904A, 904B, wherein there is provided a light-emission layer 905 for emitting white light, for example.

The row electrodes 902 and the column electrodes 903 are made narrower than the usual electrode width, as shown in FIG. 9B. This can make smaller the pixels 21 formed by the intersections between the row electrodes 902 and the column electrodes 903, thus making the light-emitting region smaller than the effective pixel area as defined by pixel density.

When a predetermined voltage is applied from the alternating-current power supply 906 selectively to between the row electrodes 902 and the column electrodes 903 of the lighting panel 10, spontaneous emission takes place due to an excitation in the light-emission layer 905, at the points corresponding to the pixels 21 formed by the intersections between the row electrodes 902 and the column electrodes 903. This causes to emit light in light-emission directions 907, 908, through the respective surfaces of the one pair of transparent substrates 901A, 901B. The tenth embodiment utilizes, for lighting, the emission light in the light-emitting direction 907.

According to the tenth embodiment, the use of the organic EL display in the lighting panel 10 makes it possible to eliminate the necessity of a backlight. The other effect is similar to the first embodiment. Incidentally, any one of the row electrode 902 and the column electrode 903 may be made narrow to make the light-emitting region smaller in size. Meanwhile, although the lighting panel 10 used the inorganic EL light-emission layer, an organic EL light emitting layer if used can make the light-emission region smaller than the size as determined by pixel arrangement density by similarly setting the electrode width.

Figure 10:
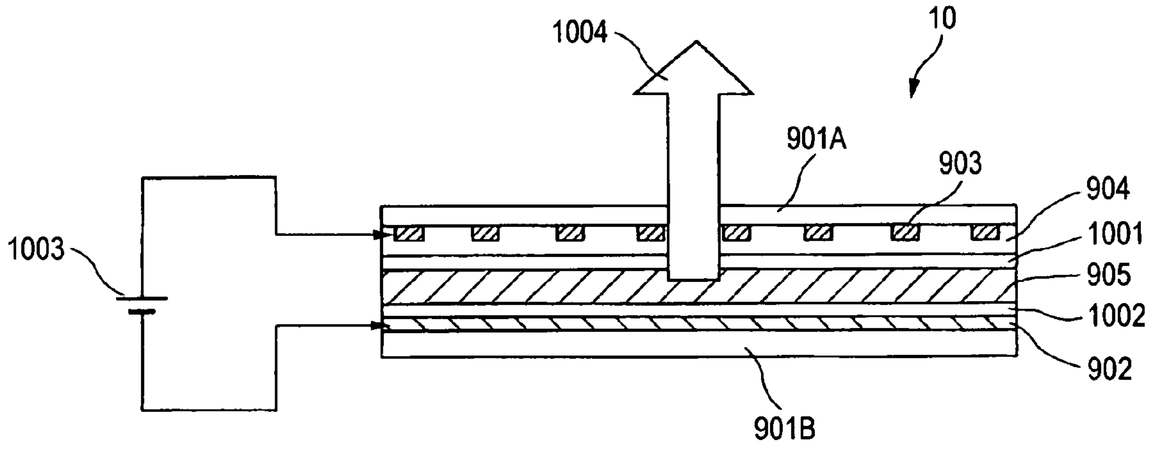
FIG. 10 is a structural view showing a multi-level optical writer according to an eleventh embodiment of the invention.

FIG. 10 shows a lighting panel according to an eleventh embodiment of the invention. This eleventh embodiment uses a three-layer-structured organic EL display having a light-emission layer 905 sandwiched between a hole transport layer 1001 and an electron transport layer 1002 in place of the inorganic EL display, in the lighting panel 10 of the tenth embodiment.

The lighting panel 10 based on the organic EL display is structured, in the FIGS. 9A and 9B tenth embodiment, with a hole transport layer 1001 provided between the insulation layer 904 and the light-emission layer 905 and an electron transport layer 1002 provided between the row electrodes 902 and the light-emission layer 905 so that, when a direct-current voltage is applied by a direct-current power source 1003, light is caused to emit in a light-emission direction 1004.

Here, the hole transport layer 1001 is provided in order to smoothly move the hole from the column electrode 903 to the light-emission layer 905 and to prevent the electron entered the light-emission layer 905 from moving into the hole transport layer 1001. Meanwhile, the electron transport layer 1002 is provided in order to smoothly move the electron to the light-emission layer 905 and to prevent the hole entered the light-emission layer 905 from moving into the electron transport layer 1002.

According to the eleventh embodiment, the use of the organic EL display in the lighting panel 10 makes it possible to eliminate the necessity of a backlight. Besides, the multi-level optical writer 1 can be reduced in operation voltage as compared to the inorganic EL panel. The other effect is similar to that of the first embodiment.

Incidentally, the lighting panel 10 based on the organic EL is not limited to the three-layer structure shown in FIG. 10 but can use various structures. For example, it is possible to employ two-layer structure using both of a light emitting layer 905 and an electron transport layer 1002, or using both of a light emitting layer 905 and a hole transport layer 1001. Meanwhile, there is known a structure that an electron injection layer or a hole injection layer is added to between the electrode and the transport layers. In any case, for the lighting panel 10 for use in the invention, at least one of the row electrode and the column electrode that are to determine a pixel size is provided as an electrode smaller than or narrower in width than the pixel size determined by the usual pixel arrangement density.

Figure 11:
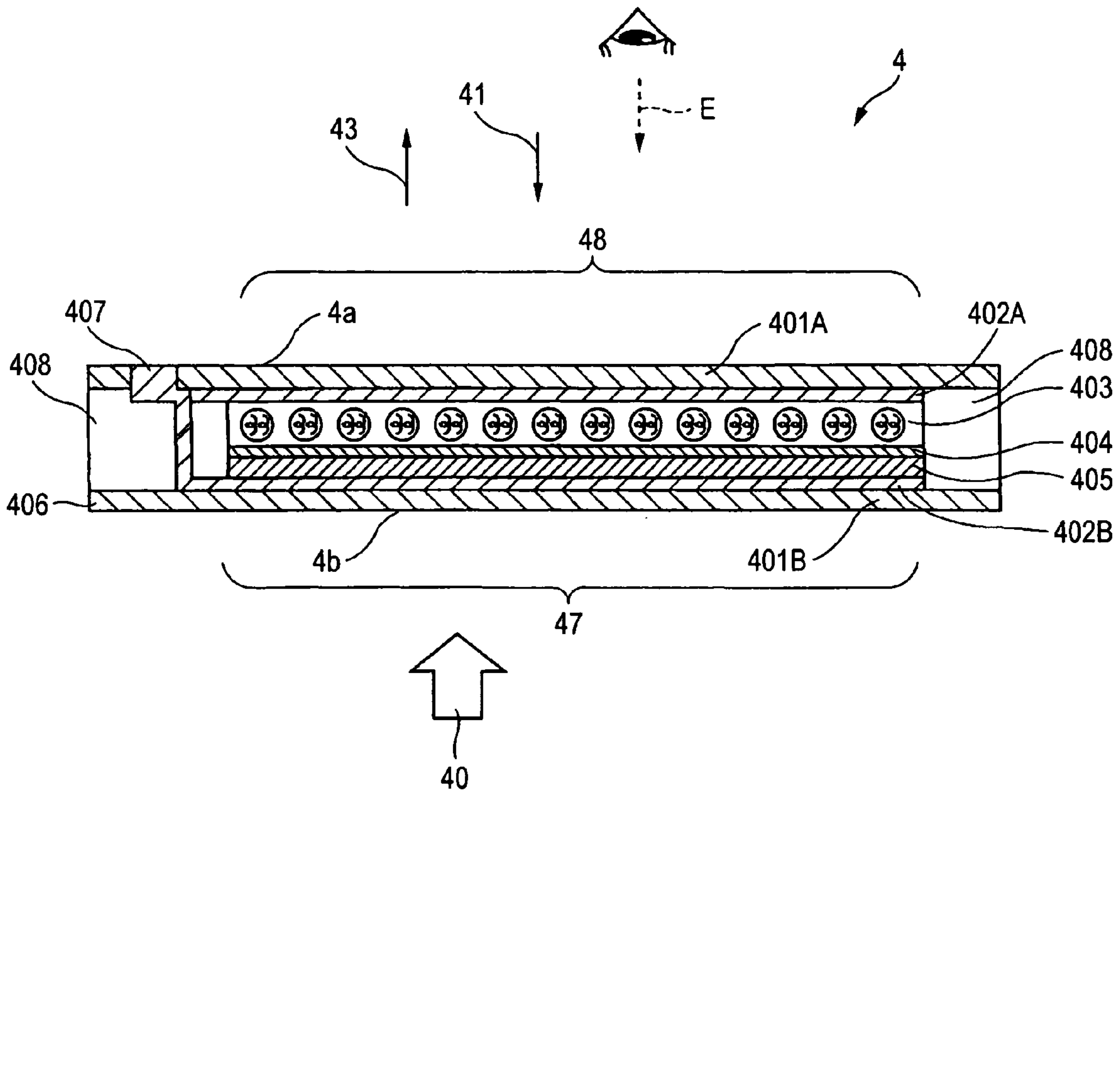
FIG. 11 is a cross-sectional view of a display recording medium according to a twelfth embodiment.

FIG. 11 shows a multi-level optical writer according to a twelfth embodiment of the invention. The twelfth embodiment is similar in structure to the FIG. 2 display recording medium excepting in that, in the display recording medium 4 in the FIG. 2 first embodiment, the isolation layer 409 is removed to replace the light absorbing layer 404 and the photoconductive layer 405.

Although initialization for the display recording medium 4 is as per the explanation in the first embodiment, image writing is by illuminating write pattern light 40 of from the lighting panel 2 to the image write region 47 at the backside 4*b* and further applying a predetermined voltage from a not-shown power source to the one pair of electricity receivers 407. Incidentally, the written image is achieved by viewing the image display region in a direction E shown in FIG. 11. Incidentally, the effect of the multi-level optical writer 1 using the display recording medium 4 is similar to that of the first embodiment.

Figure 12A:
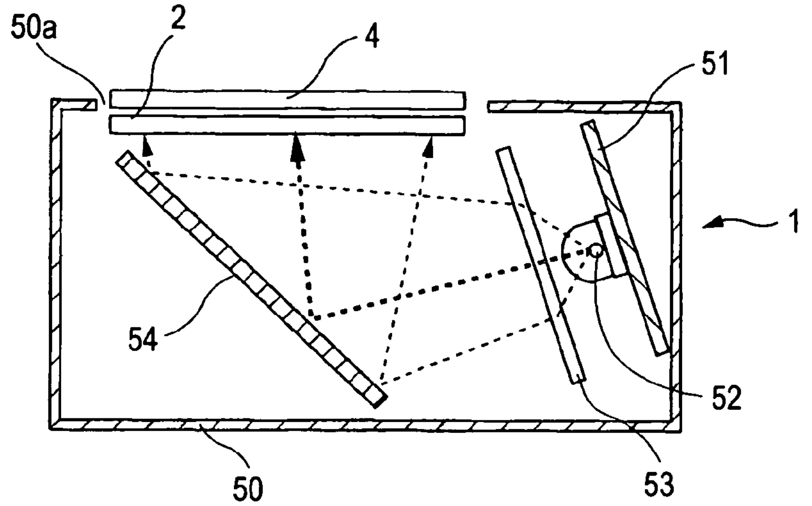
Figure 12B:
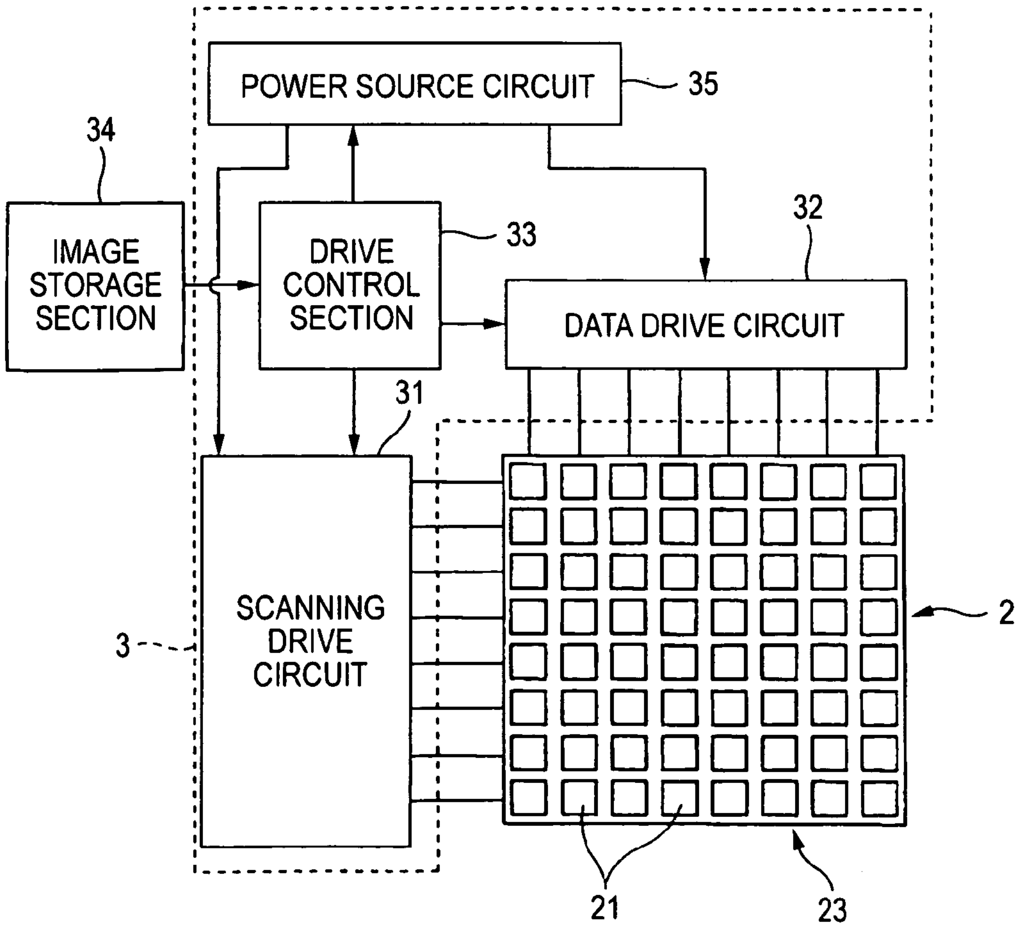

FIGS. 12A and 12B show example 1 of the invention. In the figure, FIG. 12A shows an internal structure of a multi-level optical writer while FIG. 12B shows a configuration of a control system. The multi-level optical writer 1 has a housing 50 having an aperture 50*a* in the upper part thereof, a lighting panel 2 based on a TFT-drive-scheme color LCD diagonally 2.2 inch having a light restriction member 23 arranged facing the aperture 50*a* of the housing 50 and having an RGB filter similar to the showing in FIGS. 7A to 7C, a support plate 51 attached on a side wall of the housing 50, a light source 52 as a backlight based on highly-bright red LED attached on the support plate 51, a plastic Fresnel lens 53 arranged on an emission light path of the light source 52, and a reflection mirror 54 arranged on the exit light path of the Fresnel lens 53 and beneath the lighting panel 2.

The TFT-drive-scheme color LCD used in the lighting panel 2 has a structure arranged with a liquid crystal between a common electrode and pixel electrodes provided for the respective pixels, and TFTs as switch elements connected at intersections between a plurality of scanning lines and a plurality of data lines that are provided orthogonal to each other.

Meanwhile, the apparatus 1 has a lighting-panel drive section 3, as shown in FIG. 12B. The lighting-panel drive section 3 is configured with a scanning drive circuit 31 for outputting a scanning voltage onto the scanning lines, a data drive circuit 32 for outputting a data voltage onto the data lines in accordance with a gray-level image signal Sm, a drive control section 33 for generating a gray-level image signal Sm from the image data stored in the image storage section 34 and controlling the drive circuits 31, 32 to make a display of the lighting panel 2, and a power source circuit 35 for supplying a power to the drive circuits 31, 32.

The drive control section 33 is configured with a CPU, a ROM, a RAM, a timing-signal generation circuit and so on, which are not shown. The CPU controls the scanning drive circuit 31, data drive circuit 32 and power source circuit 35 according to a control program stored in the ROM and generates a gray-level image signal Sm from the image data of from the image storage section 34, thus applying a voltage to the pixels according to the gray-level image signal Sm.

The operation of the image write operation in example 1 is now be explained. At first, the user sets up the display recording medium 4 shown in FIG. 2 with its image write display region 44 positioned lower, onto the lighting panel 2. At this time, the lighting panel 2 is in a position the light restriction member 23 is in the upper.

Then, when the user makes a write instruction by operating a not-shown exclusive button or keyboard, the drive control section 33 puts on the light source 52 and acquires image data from the image storage section 34, thus generating a gray-level image signal Sm from the image data. Then, the drive control section 33 controls the scanning drive circuit 31, data drive circuit 32 and power source circuit 35, to apply a voltage to the pixel electrode according to the gray-level image signal Sm. Namely, the scanning drive circuit 31 sequentially selects the scanning lines of the lighting panel 2 by applying a scanning voltage, thereby turning on the corresponding TFT. In synchronism therewith, the data drive circuit 32 applies a data voltage to the data lines according to the gray-level image signal Sm. Due to this, the pixels are applied by a scanning voltage and a voltage based on the data voltage.

At this time, the red light from the light source 52 is collected at the Fresnel lens 53, and then reflected by the reflection mirror 54 and illuminated to a backside of the lighting panel 2. Because the back light transmits the red-filter area of the light restriction member 23 provided on the lighting panel 2, the lighting panel 2 can illuminate the image light having a light-intensity distribution to the image write display region according to the gray-level image signal Sm. Similarly to the first embodiment, the display recording medium 4 is written by an image different in dot size according to the gray level.

According to example 1, because the RRB filter can be utilized as a light restriction member, structure can be simplified. Because the light source 52 is to emit red light, the emission light region of the lighting panel 2 can be substantially restricted to nearly 30% of the effective pixel area.

Figure 13A:
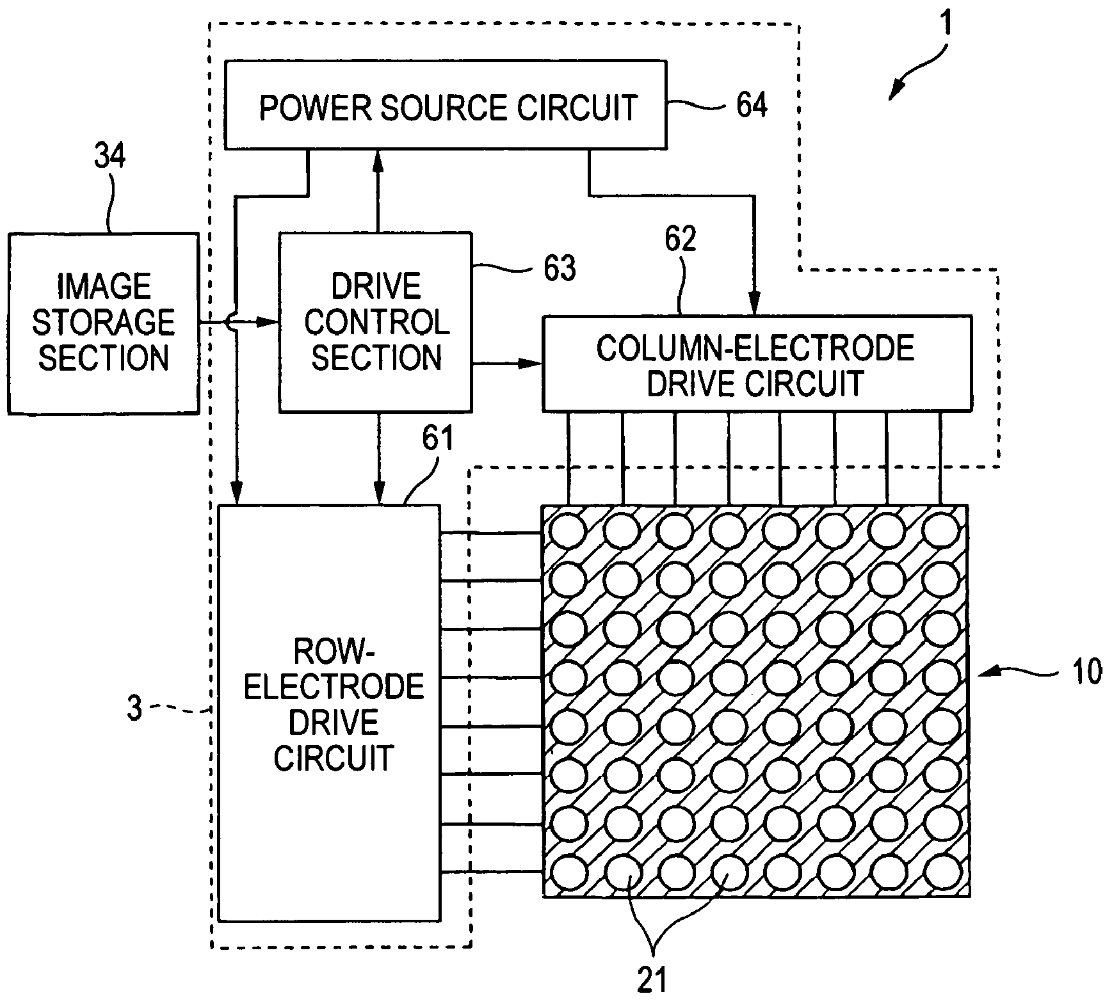
Figure 13B:
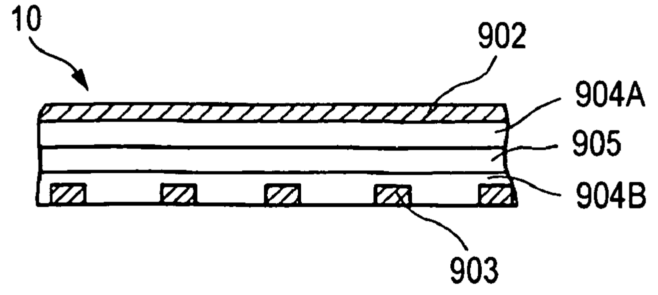

FIGS. 13A and 13B show example 2 of the invention. In the figure, FIG. 13A shows a configuration of a control system while FIG. 13B shows a cross section of a lighting panel. The multi-level optical writer 1 employs a lighting panel 10 based on an organic EL display. A lighting-panel drive section 3 has a row-electrode drive circuit 61 for applying a scanning voltage to the pixels, a column-electrode drive circuit 62 for applying a data voltage to the pixels, a drive control section 63 for generating a gray-level image signal Sm from the image data stored in an image storage section 34 and controlling the drive circuits 61, 62 to make a display on the lighting panel 10, and a power source circuit 64 for supplying a power to the drive circuit 61, 62. Incidentally, the example 2 does not require a backlight because of using an EL for spontaneous emission in the lighting panel 10.

The organic EL display of the lighting panel 10 has a plurality of row electrodes 902 and a plurality of column electrodes 903 that are arranged orthogonal to each other, insulation layers arranged inside of the row electrodes 902 and the column electrodes 903, and a light-emission layer 905 provided between the insulation layers 904A, 904B and for emitting red light.

The light-emission layer 905 is formed in the range of approximately 50% of the pixel effective area as defined by pixel density, having a peripheral region as a non-emission region. The non-emission region is substantially to play a role of emission-region limiting means. The light emitted at the pixel center spreads two-dimensionally before reaching a photoconductive layer 405 of the display recording medium 4, thus providing a light-intensity distribution approximate to the Gaussian distribution.

The drive control section 63 is configured with a CPU, a ROM, a RAM, a timing-signal generation circuit and so on, which are not shown, similarly to the drive control circuit of example 1. The CPU controls the row-electrode drive circuit 61, column-electrode drive circuit 62 and power source circuit 64 according to a control program stored in the ROM and further generates a gray-level image signal Sm from the image data of from the image storage section 34, thus applying a voltage to between the row electrode 902 and the column electrode corresponding to the pixel according to the gray-level image signal Sm.

The operation of the image write operation in example 2 is now be explained. At first, the user sets up the display recording medium 4 shown in FIG. 2 with its image write display region 44 positioned lower, on the lighting panel 10.

Then, when the user makes a write instruction by operating a not-shown exclusive button or keyboard, the drive control section 63 acquires image data from the image storage section 34, thus generating a gray-level image signal Sm from the image data. Then, the drive control section 63 controls the row-electrode drive circuit 61, column-electrode drive circuit 62 and power source circuit 64, to apply a voltage to between the column electrode 902 and the row electrode 903 corresponding to the pixel according to the gray-level image signal Sm. Due to this, the light-emission layer 905 of the lighting panel 10 illuminates the image light having a light-intensity distribution commensurate with the application voltage, to the image write display region of the display recording medium 4. Similarly to the first embodiment, the display recording medium 4 is written by an image different in dot size according to gray level.

According to example 2, by partially forming an EL emission layer, the light-emitting region of the lighting panel 2 can be substantially restricted to approximately 30% of the effective pixel area. It is possible to write an image having a gray-level nature to the display recording medium 4 by changing the size of the recording dots according to the gray level.

Incidentally, the invention is not limited to the embodiments and examples but can be modified variously within a scope not departing from the gist of the invention. Meanwhile, the structural elements of the embodiments and examples can be combined desirably within a scope not departing from the gist of the invention.

What is claimed is:

1. A multi-level optical writer for writing an image by illuminating an optical-write-type recording medium including a display layer having a memory nature and a photoconductive layer, the optical writer comprising:

a holding portion that holds the optical-write-type recording medium; and a write section that writes a multi-level image to the display layer by applying, to the photoconductive layer, an image light having optical dots different in size in accordance with gray levels of pixels of the multi-level image.

2. A multi-level optical writer according to claim 1, wherein the write section has a signal generating section for generating a light intensity signal in accordance with a gray-level signal and a light-emitting section arranged in close contact with or in proximity to the optical-write-type display recording medium and for emitting the image light having the optical dots different in light intensity and in size depending upon the light intensity signal.

3. A multi-level optical writer according to claim 2, wherein the light-emitting section has a pixel array arranged two-dimensionally with a plurality of pixels for emitting the optical dots.

4. A multi-level optical writer according to claim 2, wherein the light-emitting section has a pixel array arranged one-dimensionally with a plurality of pixels for emitting the optical dots and for moving relative to the optical-write-type display recording medium and emitting the image light two-dimensionally thereto.

5. A multi-level optical writer according to claim 3, wherein the pixel array has a light restriction member for restricting a light-emission area of each of the pixels to a narrower range than an effective pixel area that the light-emission area of the pixel is defined by a pixel density.

6. A multi-level optical writer according to claim 5, wherein the light restriction member has a plurality of circular light-transmission areas correspondingly to the pixels.

7. A multi-level optical writer according to claim 5, wherein the light restriction member has a plurality of rectangular light-transmission areas correspondingly to the pixels.

8. A multi-level optical writer according to claim 5, wherein the light restriction member has a plurality of light-transmission filters for transmitting a predetermined frequency band of light correspondingly to the pixels.

9. A multi-level optical writer according to claim 3, wherein the pixel array has a filter for providing a light intensity distribution to light emitted from the pixels.

10. A multi-level optical writer according to claim 3, wherein the pixel array has a conversion member for converting a rectangular light intensity distribution haven by light emitted from the pixel into an light intensity distribution in a mountain form.

11. A multi-level optical writer according to claim 2, wherein the light-emitting section uses an LCD.

12. A multi-level optical writer according to claim 11, wherein the LCD is a color LCD using an RGB filter as the light restricting member and a light source, as a backlight, for generating red, green or blue light.

13. A multi-level optical writer according to claim 2, wherein the light-emitting section uses an EL display.

14. A multi-level optical writer according to claim 13, wherein the EL display restricts the light-emission area of the pixel to a narrower range than a pixel effective area that the light-emission area of the pixel is defined by a pixel density, by setting a width of at least one of row and column electrodes to a predetermined value.

15. A multi-level optical writer according to claim 13, wherein the EL display has pixels each structured with a light-emission area and a non-light-emission area thereby restricting the light-emission area of the pixel to a narrower range than a pixel effective area that the light-emission area of the pixel is defined by a pixel density.

16. The multi-level optical writer according to claim 2, wherein:

the light-emitting section has;

a pixel array with a plurality of pixels that are arranged two-dimensionally for emitting the optical dots, a light restriction member that is disposed on a light-emission side of the pixel array and is formed with optical openings that correspond to the plurality of pixels, and each optical opening has an optical opening area that is smaller than an effective pixel area of the corresponding pixel.

17. The multi-level optical writer according to claim 16, wherein the optical opening area of each optical opening is in a range of 20% to 80% of the effective area of the corresponding pixel.

18. The multi-level optical writer according to claim 1, wherein the write section is configured to apply the image light to the photoconductive layer of the optical-write-type recording medium while applying a voltage between electrodes of the optical-write-type recording medium.

19. The multi-level optical writer according to claim 1, wherein the write section is configured to be in close contact with the optical-write-type recording medium when applying the image light to the optical-write-type recording medium.

* * * * *